(12) United States Patent
Oka et al.

(10) Patent No.: US 7,733,449 B2
(45) Date of Patent: Jun. 8, 2010

(54) LIQUID CRYSTAL DISPLAY

(75) Inventors: Shinichiro Oka, Hitachi (JP); Masaya Adachi, Hitachi (JP); Shinichi Komura, Hitachi (JP); Ikuo Hiyama, Hitachinaka (JP)

(73) Assignee: Hitachi Displays, Ltd., Mobara-shi (JP)

( * ) Notice: Subject to any disclaimer, the term of this patent is extended or adjusted under 35 U.S.C. 154(b) by 695 days.

(21) Appl. No.: 11/356,188

(22) Filed: Feb. 17, 2006

(65) Prior Publication Data
US 2006/0221280 A1 Oct. 5, 2006

(30) Foreign Application Priority Data
Mar. 31, 2005 (JP) ............................. 2005-100483

(51) Int. Cl.
*G02F 1/1335* (2006.01)
(52) U.S. Cl. ..................... 349/117; 349/118; 349/119
(58) Field of Classification Search ......... 349/117–119, 349/96
See application file for complete search history.

(56) References Cited

U.S. PATENT DOCUMENTS

| 2001/0048497 | A1 | 12/2001 | Miyachi et al. |
| 2003/0081166 | A1* | 5/2003 | Pan et al. ..................... 349/158 |
| 2003/0156235 | A1* | 8/2003 | Kuzuhara et al. ............. 349/96 |
| 2003/0193636 | A1* | 10/2003 | Allen et al. ................. 349/117 |
| 2004/0090578 | A1* | 5/2004 | Chang et al. ................ 349/117 |
| 2004/0095536 | A1* | 5/2004 | Yoshida et al. .............. 349/117 |
| 2005/0264735 | A1* | 12/2005 | Tago et al. .................. 349/119 |
| 2006/0072054 | A1* | 4/2006 | Ito .............................. 349/96 |
| 2006/0274248 | A1* | 12/2006 | Kim et al. .................... 349/141 |
| 2007/0126961 | A1* | 6/2007 | Tsai et al. .................... 349/119 |

FOREIGN PATENT DOCUMENTS

| JP | 05-113561 | 5/1993 |
| JP | 06-059122 | 3/1994 |
| JP | 10-068816 | 3/1998 |
| JP | 2003-295165 | 10/2003 |
| JP | 2004-333830 | 11/2004 |

OTHER PUBLICATIONS

Liquid Crystal Forum (PC05), 2004, Toshiuki Hyuuga, Takahiro Ishinabe, Tatsuo Uchida, Establishment of a Design Parameter To Define A Viewing Angle Property In Biaxial Retardation Films, pp. 446-447.
IDW 04 Proceedings, FMC3-3, p. 579-582, T. Eguchi, et al, New Color Filter Carried Out By A Roll-To-Roll Process, Eguchi et al.
U.S. Appl. No. 11/038,092, filed Jan. 21, 2005, Hitachi Display LTD.
Office Action in Chinese Patent Appln. No. 2006100062111; (4 pages), in Chinese.

* cited by examiner

*Primary Examiner*—David Nelms
*Assistant Examiner*—Thanh-Nhan P Nguyen
(74) *Attorney, Agent, or Firm*—Antonelli, Terry, Stout & Kraus, LLP.

(57) ABSTRACT

A liquid crystal display of a vertical alignment (VA) mode using a circular polarization plate is provided which can reduce light leak as observed along an oblique direction and achieve a high contrast ratio. The VA mode uses a liquid crystal layer of vertical alignment in an initial alignment state. A film having generally isotropic optical characteristics in an omnidirection is used as a protective film, on a liquid crystal cell side, of first and second polarization plates disposed outside the liquid crystal cell, and first and fourth retardation films have an $N_z$ coefficient smaller than 1.

16 Claims, 11 Drawing Sheets

0°

30°

45°

Class I

Class II

LIQUID CRYSTAL DISPLAY

BACKGROUND OF THE INVENTION

1. Field of the Invention

The present invention relates to a liquid crystal display for displaying images.

2. Description of the Related Art

A liquid crystal display is a non-emission type display for displaying images by adjusting an optical transmission amount and has characteristics of thinness, light weight and low consumption power.

Liquid crystal displays include a transmission type liquid crystal display and a reflection type liquid crystal display. In the transmission type liquid crystal display, a light source (hereinafter called a backlight) is disposed at the back of the display and an optical transmission amount of the backlight is adjusted to display images. In the reflection type liquid crystal display, external light such as room illumination and sun light is made incident upon the display from the front side and the optical reflection amount of the external light is adjusted to display images. There is a liquid crystal display (hereinafter called a transflective type liquid crystal display) which can be used as a reflection type liquid crystal display in a bright environment and as a transmission type liquid crystal display in a dark environment. The transflective type liquid crystal display has both display functions of the reflection type and transmission type, and can reduce a consumption power by turning off a backlight in the bright environment. In the dark environment, images become visible by turning on the backlight. Namely, this liquid crystal display is suitable for a liquid crystal display of a portable apparatus such as a portable phone and a digital camera which is supposed to be in various illumination environments.

One of driving modes realizing a liquid crystal display is a vertical alignment (VA) mode. Liquid crystal molecules used in the VA mode are aligned perpendicular to substrate surfaces while voltage is not applied. A pair of substrates is sandwiched between two polarization plates whose absorption axes cross at a right angle (hereinafter, this state is called cross-nicol) so that light of the backlight is intercepted by the polarization plates to present black display.

A viewing angle range during black display of a liquid crystal display in the VA mode can be broadened by disposing a retardation film called a negative C plate (hereinafter called a negative C-Plate) between the liquid crystal layer and the polarization plate. The negative C-Plate is a negative index ellipsoid which has a refractive index of almost 0 in an in-plane direction and whose refractive index in a thickness direction is smaller than the refractive index in the in-plane direction. The liquid crystal display in the VA mode adopting the negative C-Plate is therefore applied to a large size liquid crystal television which is required to have a large viewing angle.

The liquid crystal display in the VA mode adopts a multi-domain to provide a plurality of tilt directions of liquid crystal molecules and to improve color change, gradation reversal and the like during gray scale display. This can be achieved by alignment control projections, electrode slits and the like. For example, it is possible to tilt liquid crystal molecules omni-directionally be disposing a circular projection in a pixel center area. However, if liquid crystal molecules are tilted omnidirectionally, a black line called a domain is observed in a cross-nicol state in the area where liquid crystal molecules are tilted along a direction parallel to an absorption axis of each polarization plate and light cannot be transmitted. This may cause a lowered transmittance.

In order to avoid this, the liquid crystal display in the VA mode applied to a large size liquid crystal television has an electrode structure which makes liquid crystal molecules tilt in approximately a 45° direction relative to the absorption axis of the polarization plate. However, this electrode structure lowers an aperture ratio more than the above-described circular projection is disposed in the pixel center area. As a method of solving this issue, JP-A-5-113561 (which corresponds to EP 0538796A1) discloses a method of utilizing a circular polarization plate combining a polarization plate and a quarter wavelength plate. In this case, light transmits even in the domain region so that a high transmittance can be achieved.

In practical use, a large bandwidth circular polarization plate is adopted applying a quarter wavelength plate having low wavelength dependency. As described in JP-A-10-68816, the large bandwidth circular polarization plate can be realized by combining a polarization plate, a half wavelength plate and a quarter wavelength plate.

By applying a circular polarization plate to a liquid crystal display in the VA mode, a trnasflective type liquid crystal display can be realized as described in, for example, JP-A-2003-295165 (which corresponds to U.S. 2003/0160928A1).

As described above, the liquid crystal display in the VA mode using a circular polarization plate can effectively utilize the domain region in a pixel. It is also possible to realize a transflective type liquid crystal display suitable for portable apparatus. However, with the liquid crystal display in the VA mode adopting a circular polarization plate, a contrast ratio lowers because optical leak during black display appearing as observed along an oblique direction cannot be suppressed sufficiently even a negative C-plate is used. Namely, there arises an issue that the liquid crystal display in the VA mode using a circular polarization plate cannot obtain sufficient viewing angle characteristics.

SUMMARY OF THE INVENTION

The present invention has been made to solve the above-described issue and aims to provide a liquid crystal display capable of obtaining a high contrast ratio in a wide viewing angle range.

In order to achieve the above object, the present invention provides a liquid crystal display comprising: a first substrate and a second substrate; a liquid crystal layer sandwiched between the first substrate and the second substrate; a first polarization plate disposed on the first substrate on a side opposite to the liquid crystal layer; a second polarization plate disposed on the second substrate on a side opposite to the liquid crystal layer; one or more retardation films disposed between the first substrate and the first polarization plate and between the second substrate and the second polarization plate; pixel electrodes disposed on one of the first substrate and the second substrate on a side of the liquid crystal layer; and a counter electrode disposed on the other of the first substrate and the second substrate on the side of the liquid crystal layer, wherein: longer axes of liquid crystal molecules of the liquid crystal layer are aligned generally perpendicular to the first substrate and the second substrate while voltage is not applied; the first polarization plate and the second polarization plate include each a polarization layer and a pair of protective layers sandwiching the polarization layer; and a retardation $R_{th}$ of the protective layers disposed on the first polarization plate and the second polarization plate on the side opposite to the liquid crystal layer is −5 nm or larger and 5 nm or smaller.

The first and second polarization plates have each a polarization layer and a protective layer disposed on the polarization layer only on the side of the liquid crystal layer.

A positive C-Plate is disposed between the first substrate and first polarization plate and between the second substrate and second polarization plate.

A liquid crystal display can be realized which can obtain a high contrast ratio in a wide viewing angle range.

Other objects, features and advantages of the invention will become apparent from the following description of the embodiments of the invention taken in conjunction with the accompanying drawings.

DESCRIPTION OF THE EMBODIMENTS

Figure 1:
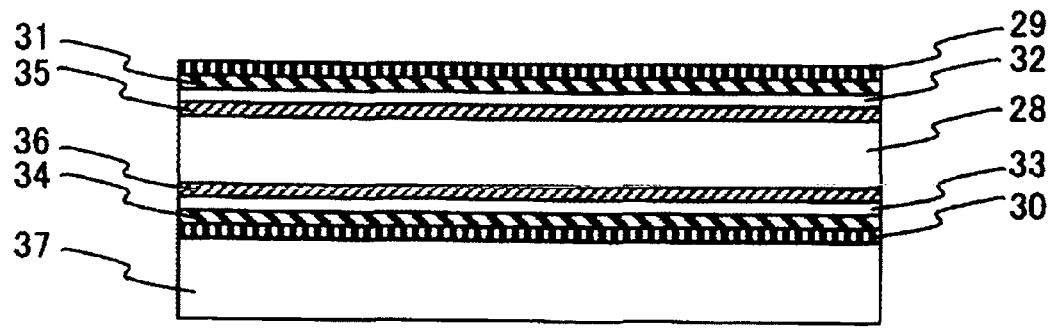
FIG. 1 is a schematic diagram showing the cross sectional structure of a liquid crystal display according to a first embodiment of the present invention.

A liquid crystal display in a VA mode using a circular polarization plate has light leak as observed along an oblique direction during black display. There arises an issue of a lowered contrast ratio along the oblique direction. A polarization plate used in a liquid crystal display is constituted of a polarization layer and a protective film for protecting the polarization layer. The protective film is made of a tri-acetyl cellulose (hereinafter called TAC) film. This TAC film can be regarded as a negative index ellipsoid, i.e., negative C-Plate which has a refractive index of almost 0 in an in-plane direction and whose refractive index in a thickness direction is larger than that in the in-plane direction.

In a liquid crystal display in the VA mode not using the circular polarization plate, if the TAC film as the protective layer of the polarization plate functions as a negative C-Plate, the TAC film takes a partial role of the function of the negative C-Plate originally disposed to reduce light leak, so that any problem occurs. Rather, in the liquid crystal display in the VA mode not using the circular polarization plate, the function as the negative C-Plate of the TAC film of the polarization plate is an essential element because this function is positively used to prevent light leak as observed along the oblique direction.

In a liquid crystal display in the VA mode using a circular polarization plate, a retardation film is disposed between the polarization plate and liquid crystal layer. In addition, a negative C-Plate is disposed to prevent light leak along the oblique direction. Namely, in the liquid crystal display in the VA mode using a circular polarization plate, the retardation film is disposed between the polarization plate and negative C-Plate. In this case, since an optical element (retardation film) forming a phase difference is disposed between the negative C-Plate and the TAC film as the protective layer of the polarization plate, the function as the negative C-Plate of the TAC film does not function effectively to suppress light leak along the oblique direction. Rather, because of an unnecessary phase difference formed while light progressing along the oblique direction transmits through the TAC film, light leak is generated during black display, resulting in a lowered contrast ratio.

In order to solve this problem, a film having generally isotropic optical characteristics in an omnidirection is used in place of the TAC film as the protective layer of the polarization plate, or the protective layer is omitted. As a half wavelength plate for realizing a large bandwidth circular polarization plate, a half wavelength plate having an $N_z$ coefficient of 0 or larger and smaller than 1 is used so that light leak can be reduced. The half wavelength plate of the invention has a relation of $n_x > n_z > n_y$.

Embodiments of the invention will be described with reference to the accompanying drawings.

First Embodiment

This embodiment is effective for improving a contrast ratio, of a liquid crystal display in a VA mode adopting a circular polarization plate, in a wide viewing angle range, by using as a protective layer of the polarization plate a film having generally isotropical optical characteristics along an omnidirection, in place of a TAC film.

FIG. 1 is a schematic diagram showing the cross sectional structure of a liquid crystal display according to the invention.

The liquid crystal display of the invention is constituted of a liquid crystal cell 28 disposed between a first polarization plate 29 and a second polarization plate 30. Three retardation films are disposed between the first polarization plate 29 and the liquid crystal cell 28. These three retardation films are a first retardation film 31, a second retardation film 32 and a first negative C-Plate 35 in this order from the first polarization plate 29 side. Similarly, three retardation films are disposed between the second polarization plate 30 and the liquid crystal cell 28. These three retardation films are a second negative C-Plate 36, a third retardation film 33 and a fourth retardation film 34 in this order from the liquid crystal cell 28 side. A backlight unit 37 is disposed on the second polarization plate 30 on the side opposite to the liquid crystal cell 28.

Namely, the negative C-Plate (first negative C-Plate 35, second negative C-Plate 36) is disposed between the first substrate 10 and retardation film and between the second substrate 11 and retardation film.

A phase difference between the first retardation film 31 and fourth retardation film 34 is a half wavelength. The first retardation film 31 and fourth retardation film 34 are made of polycarbonate, norbornene resin or the like.

A phase difference between the second retardation film 32 and third retardation film 33 is a quarter wavelength. The second retardation film 32 and third retardation film 33 are made of polycarbonate, norbornene resin or the like.

The first negative C-Plate 35 may be made of cellulose acylate such as cellulose acetate and cellulose acetate butylate, polycarbonate, polyolefin, polystyrene, polyester or the like. Synthetically, cellulose acylate is preferable, and more preferably, cellulose acetate.

The second negative C-Plate 36 may be made of material similar to that of the first negative C-Plate 35. It is desired that $R_{th}$ of the first negative C-plate 35 and second negative C-Plate 36 is approximately the same.

The backlight unit 37 is constituted of an LED as a light source, an optical waveguide, a diffuser and the like. Although it is preferable to use a white LED, LEDs of RGB three colors may be used. The light source and structure of the backlight unit 37 are not limited to those described above, but any unit may be used if it can illuminate the liquid crystal cell from the back. For example, a cold cathode fluorescent (CCFL) tube may be used as a light source.

Figure 5:
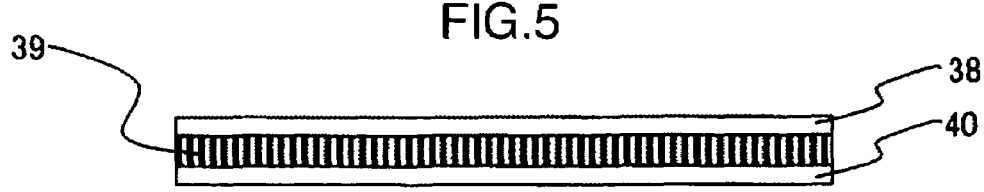
FIG. 5 is a schematic diagram showing the cross sectional structure of a first polarization plate according to the first embodiment.

FIG. 5 is a schematic diagram showing the cross sectional structure of the first polarization plate 29. The first polarization plate 29 is constituted of a first polarization layer 39 made of a drawn polyvinyl alcohol (PVA) layer, and a first protective film 38 and a second protective film 40 sandwiching and protecting the first polarization layer 39. The second protective film 40, first polarization layer 39 and first protective film 38 are disposed in this order from the liquid crystal cell 28 side.

Figure 6:
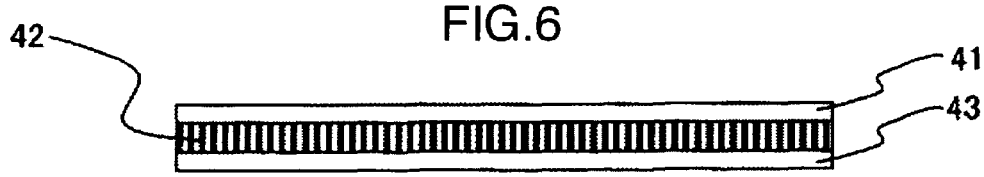
FIG. 6 is a schematic diagram showing the cross sectional structure of a second polarization plate according to the first embodiment.

FIG. 6 is a schematic diagram showing the cross sectional structure of the second polarization plate 30. Similar to the first polarization plate, the second polarization plate 30 is constituted of a second polarization layer 42 made of a drawn PVA layer, and a third protective film 41 and a fourth protective film 43 sandwiching and protecting the second polarization layer 42. The third protective film 41, second polarization layer 42 and fourth protective film 43 are disposed in this order from the liquid crystal cell 28 side. The first polarization plate 29 and second polarization plate 30 are disposed in such a manner that the absorption axes are generally perpendicular.

Figure 2:
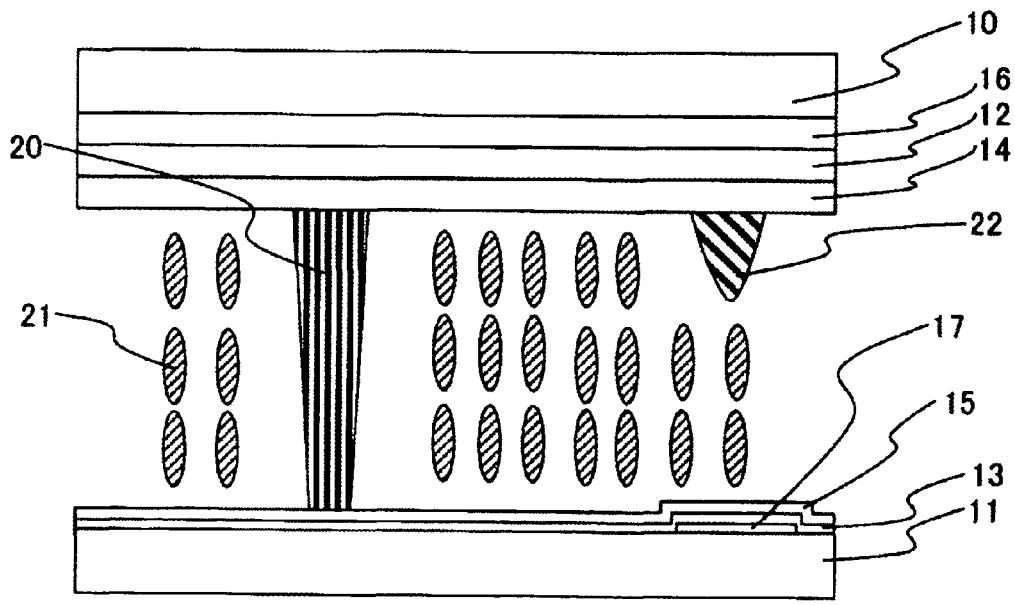
FIG. 2 is a schematic diagram showing the cross sectional structure of a liquid crystal cell according to the first embodiment.
Figure 4:
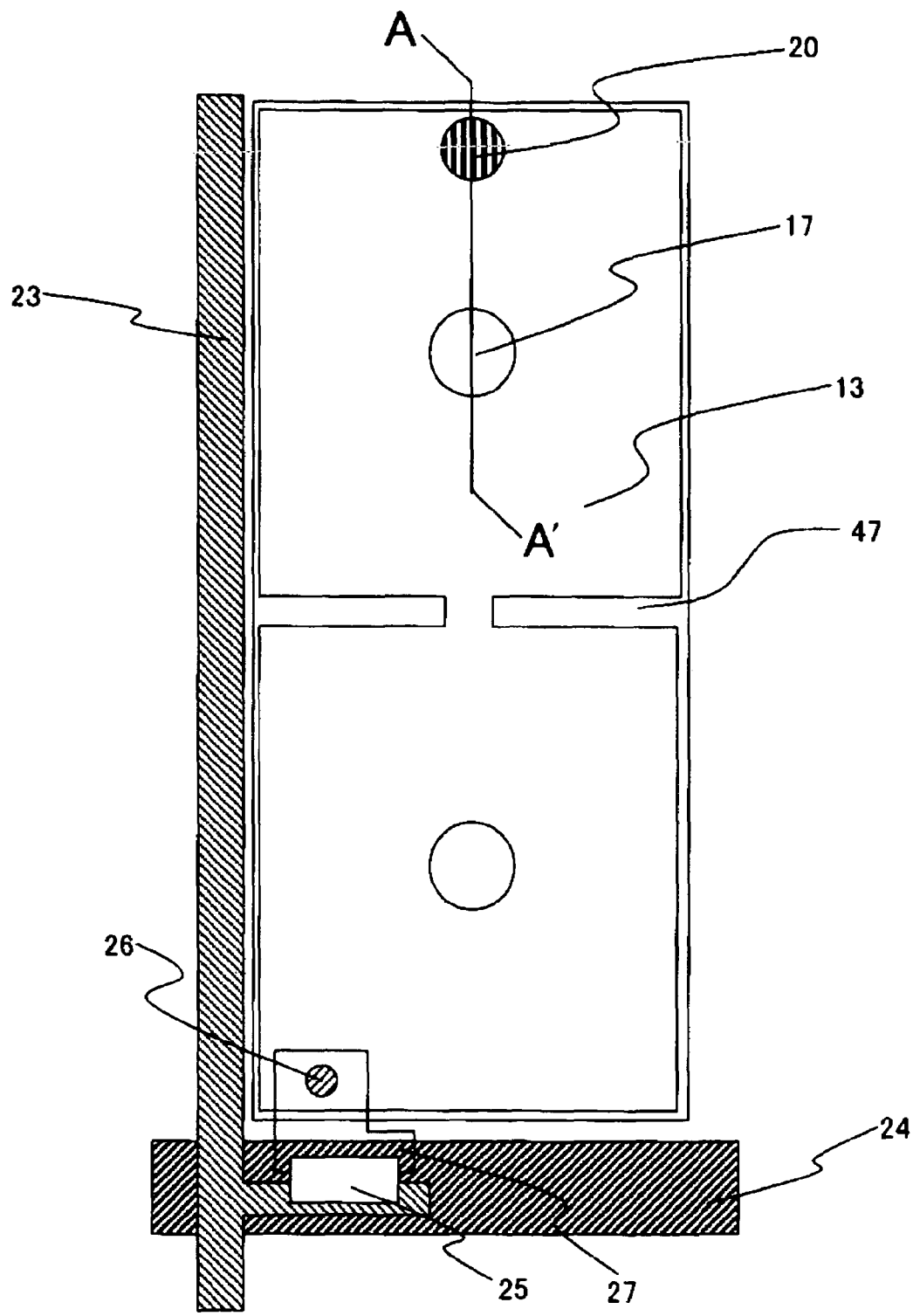
FIG. 4 is a plan view showing the outline structure of a pixel of a second substrate according to the first embodiment.

FIG. 2 is a schematic diagram showing the cross sectional structure of the liquid crystal cell 28 taken along line A-A' shown in FIG. 4.

The liquid crystal cell 28 has the first substrate 10 and second substrate 11. The first substrate 10 and second substrate 11 sandwich the liquid crystal layer 21. The first substrate 10 has a color filter 16, a common electrode 12 and a first alignment film 14 on the side where the liquid crystal layer 21 is disposed. The second substrate 11 has pixel electrodes 13 and a second alignment film 15 on the side where the liquid crystal layer 21 is disposed. A columnar spacer 20 is disposed between the first substrate 10 and second substrate 11 in order to maintain constant the thickness of the liquid crystal layer 21. An alignment controlling projection 22 is disposed on the first substrate 10 on the side nearer to the liquid crystal layer 21 (in this embodiment, on the alignment film 14). A black matrix 17 is disposed on the second substrate 11 on the side nearer to the liquid crystal layer, in correspondence with the projection 22.

The first substrate 10 and second substrate 11 are transparent to allow light to transmit therethrough, and is made of, e.g., glass or plastic. However, since plastic allows air to transmit therethrough, a gas barrier may be used by forming a nitride film or the like on the substrate surface.

The liquid crystal layer 21 is made of liquid crystal compositions having negative dielectric anisotropy providing a dielectric constant of a liquid crystal molecule in a long axis direction smaller than that in a short axis direction. The liquid crystal layer 21 is made of liquid crystal material which shows a nematic phase in a wide range including a room temperature range. The material to be used has such a high electrical resistivity as the transmittance is sufficiently retained and flicker will not occur, during a retention period under the TFT driving conditions, e.g., of a resolution of QVGA (240 lines) and a driving frequency of 60 Hz. Namely, the resistivity of the liquid crystal layer 21 is preferably $10^{12}$ $\Omega cm^2$ or higher, or more preferably $10^{13}$ $\Omega cm^2$ or higher.

The color filter 16 is made of red/green/blue regions through which red/green/blue light transmits, and may have a stripe layout, a delta layout or the like.

The common electrode 12 is made of transparent conductive material, e.g., indium tin oxide (hereinafter called ITO) or zinc oxide (ZnO).

The first alignment film 14 and second alignment film 15 have the function of vertically aligning liquid crystal molecules on the substrate surfaces. Although the first alignment film 14 and second alignment film 15 are preferably made of a polyimide organic film, it may be made of a SiO vertical vacuum evaporation film, a surface active agent, a chrome complex or the like.

The black matrix 17 is disposed to intercept light leak to be caused by liquid crystal alignment disturbance near the alignment control projection 22. The material of the black matrix 17 is opaque material such as metal, and preferably chrome, tantalum molybdic, tantalum, aluminum, copper or the like.

The alignment control projection 22 is disposed in order to regulate the direction of a liquid crystal molecule which tilts upon application of an electric field. In the peripheral area of the alignment control projection 22, the alignment direction of a liquid crystal molecule in the liquid crystal layer 21 tilts from a substrate normal in accordance with an inclination of the alignment control projection. The alignment control projection 22 is made of, e.g., acrylic resin. The projection can be formed by photo etching of acrylic resin. The alignment control method for a liquid crystal display in the VA mode is not limited only to the projection, but an electrode slit structure such as described in JP-A-7-230097 may also be used.

Figure 3:
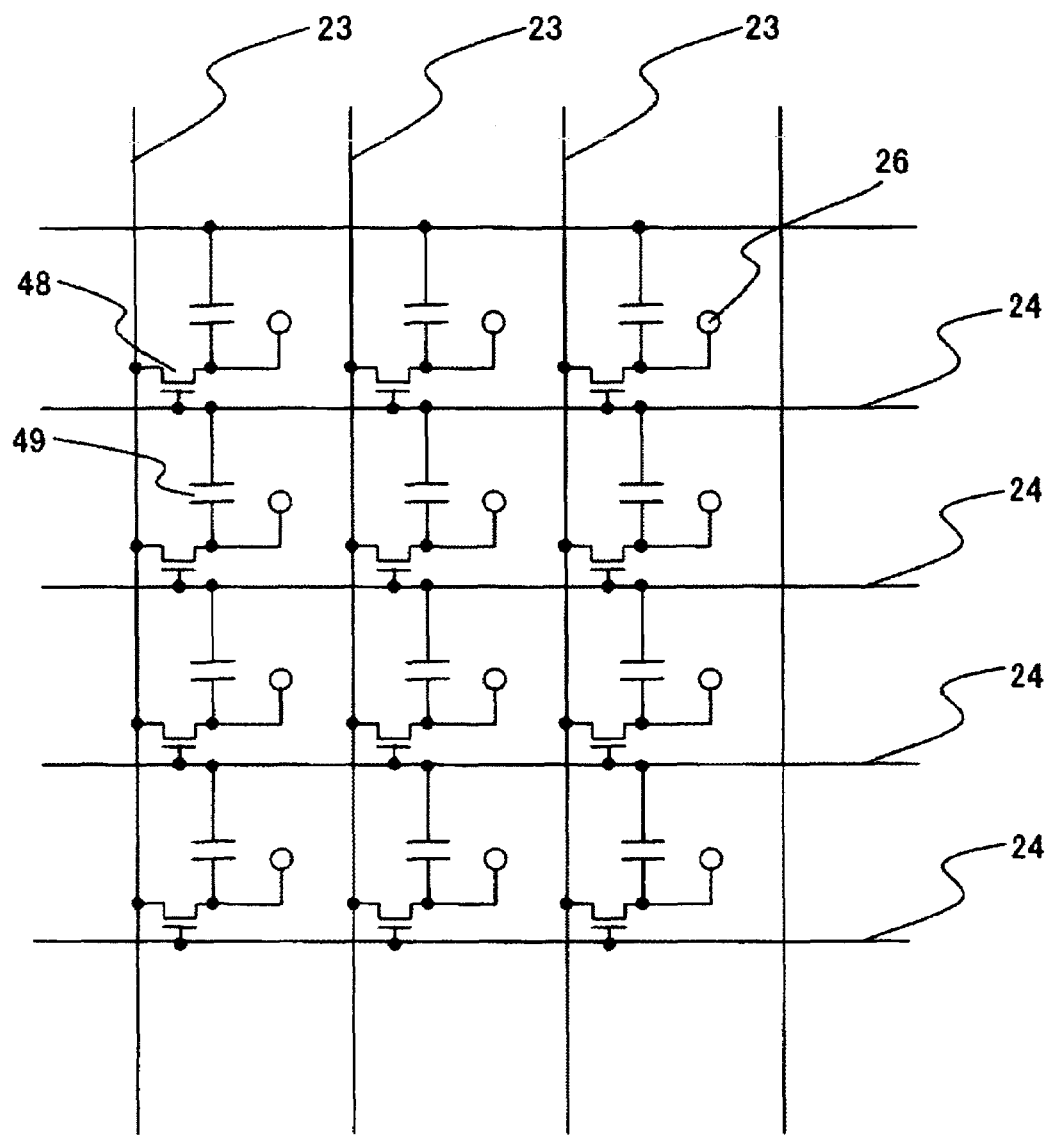
FIG. 3 is a diagram showing an equivalent circuit of pixels disposed in a matrix shape and constituting a pixel display area according to the first embodiment.

FIG. 3 is a diagram showing an equivalent circuit of pixels disposed in a matrix shape and constituting a pixel display area. The pixel display area has signal wirings 23 and scan wirings 24. One pixel is shown in an area surrounded by the signal wirings 23 and scan wirings 24. Pixels are disposed in a matrix layout. Each pixel has at least one thin film transistor 48 (hereinafter called TFT). The signal wirings 23 and scan wirings 24 are disposed generally perpendicular and TFT 48 is disposed near at a cross point of the signal wiring and scan wiring. Each pixel has at least one storage capacitor 49. TFT 48 is connected to a through hole 26. Although FIG. 3 uses active matrix driving by way of example, the embodiment has similar advantages also for active matrix driving.

A signal for controlling the liquid crystal layer 21 is applied to each signal wiring 23. The material of the signal wiring 23 is low resistance conductive material and is preferably chrome, tantalum molybdic, tantalum, aluminum, copper or the like.

A signal for controlling TFT is applied to each scan wiring 24. Similar to the signal wiring 23, the material of the scan wiring 24 is preferably chrome, tantalum molybdic, tantalum, aluminum, copper or the like.

The storage capacitor 49 is disposed in order to prevent a retained image signal from being leaked.

FIG. 4 is a plan view showing the outline structure of one pixel of the second substrate 11. TFT 48 is inversely staggered, and has a semiconductor layer 25 in the channel region and a through hole 26 for interconnecting a pixel electrode 13 and a source electrode 27. The black matrix 17 is disposed in an area approximately corresponding to the alignment control projection 22 disposed on the counter first substrate 10.

The pixel electrode 13 is disposed in order to apply an electric field to the liquid crystal layer 21. The pixel electrode 13 is made of material similar to that of the common electrode 12. An electrode slit portion 47 is provided near the pixel center area of the pixel electrode 13.

It is desired that a liquid crystal display in the VA mode has a multi-domain to provide a plurality of tilt directions of liquid crystal molecules and to improve color change, gradation reversal and the like during gray scale display. In this embodiment, since liquid crystal molecules tilt omnidirectionally around the alignment control projection 22, the multi-domain can be realized. However, if liquid crystal molecules are tilted omnidirectionally, a black line called a domain is observed in a cross-nicol state in the area where liquid crystal molecules are tilted along a direction parallel to an absorption axis of each polarization plate and light cannot be transmitted. This domain may cause a lowered transmittance. In order to avoid this, there is a method of utilizing a circular polarization plate. By using the circular polarization plate, light can transmit even in the domain region.

It has been proposed that a negative C-Plate is disposed between each of the polarization plates 29 and 30 and the liquid crystal layer of a liquid crystal display in the VA mode in order to reduce light leak to be observed along an oblique direction during black display. The negative C-Plate is an optical element which can be regarded as an optically negative index ellipsoid which has a refractive index of almost 0 in an in-plane direction and whose refractive index in a thickness direction is smaller than the refractive index in the in-plane direction. The negative index ellipsoid is represented by a retardation (hereinafter called $R_{th}$) in a thickness direction expressed by the following equation:

$$R_{th} = \left(\frac{n_x + n_y}{2} - n_z\right) \cdot d \quad (1)$$

wherein $n_x$, $n_y$ and $n_z$ are refractive indices along main axes directions of the index ellipsoid, $n_x$ and $n_y$ are refractive indices along the in-plane direction and $n_z$ is a refractive index along the thickness direction. d is a thickness of the retardation film (in this example, negative C-Plate). The liquid crystal layer of a liquid crystal display in the VA mode during black display can be regarded as an optically positive index ellipsoid which has a refractive index difference of almost 0 in an in-plane direction and whose refractive index in a thickness direction is smaller than the refractive index in the in-plane direction. Namely, the negative C-Plate which can be regarded as an optically negative index ellipsoid can compensate for the liquid crystal layer which can be regarded as an optically positive index ellipsoid. It is therefore desired not to dispose an optical element between the liquid crystal layer and the negative C-Plates disposed to suppress light leak along an oblique direction.

A polarization plate used by a liquid crystal display has generally the structure that a polarization film made of polyvinyl alcohol (hereinafter called PVA) adsorbing iodine to impart a polarization function is sandwiched between protective films made of a tri-acetyl cellulose (hereinafter called TAC) film. Generally, the TAC film can be regarded as a negative index ellipsoid, i.e., negative C-Plate which has a refractive index difference of almost 0 in the in-plane direction and whose refractive index in the thickness direction is smaller than a refractive index in the in-plane direction.

In a liquid crystal display in the VA mode not using a circular polarization plate, as the TAC film as the protective film of the polarization plate functions as the negative C-Plate, the TAC film takes a partial role of the function of the negative C-plate disposed to reduce light leak along the oblique direction so that any problem will not occur. Rather, in the liquid crystal display in the VA mode not using a circular polarization plate, the negative C-Plate function of the TAC film of the polarization plate is an essential element to be positively used for preventing light leak to be observed along the oblique direction.

On the other hand, in a liquid crystal display in the VA mode using a circular polarization plate, generally two positive A plates (hereinafter called A-Plate) are disposed between the polarization plates and the liquid crystal layer, as quarter wavelength plates for realizing large bandwidth circular polarization plates, and in addition, negative C-Plates are disposed to prevent light leak along the oblique direction. The positive A-Plate is a uniaxial retardation film having an $N_z$ coefficient of 1.0. The $N_z$ coefficient is defined by the following equation:

$$N_z = \frac{n_x - n_z}{n_x - n_y} \quad (2)$$

Since C-Plate has a relation of $n_x > n_y = n_z$, the $N_z$ coefficient is 1.0. In the liquid crystal display in the VA mode using a circular polarization plate, retardation films exist between the polarization plate and negative C-Plate. In this case, since there exist optical elements (retardation films) forming a phase difference between the polarization plate and negative C-Plate, the function of the TAC film as the negative C-Plate cannot operate effectively to suppress light leak along the oblique direction. Rather, light progressing along the oblique direction becomes light leak during black display because of an unnecessary phase difference while the light transmits through the TAC films, resulting in a lowered contrast ratio.

Figure 7:
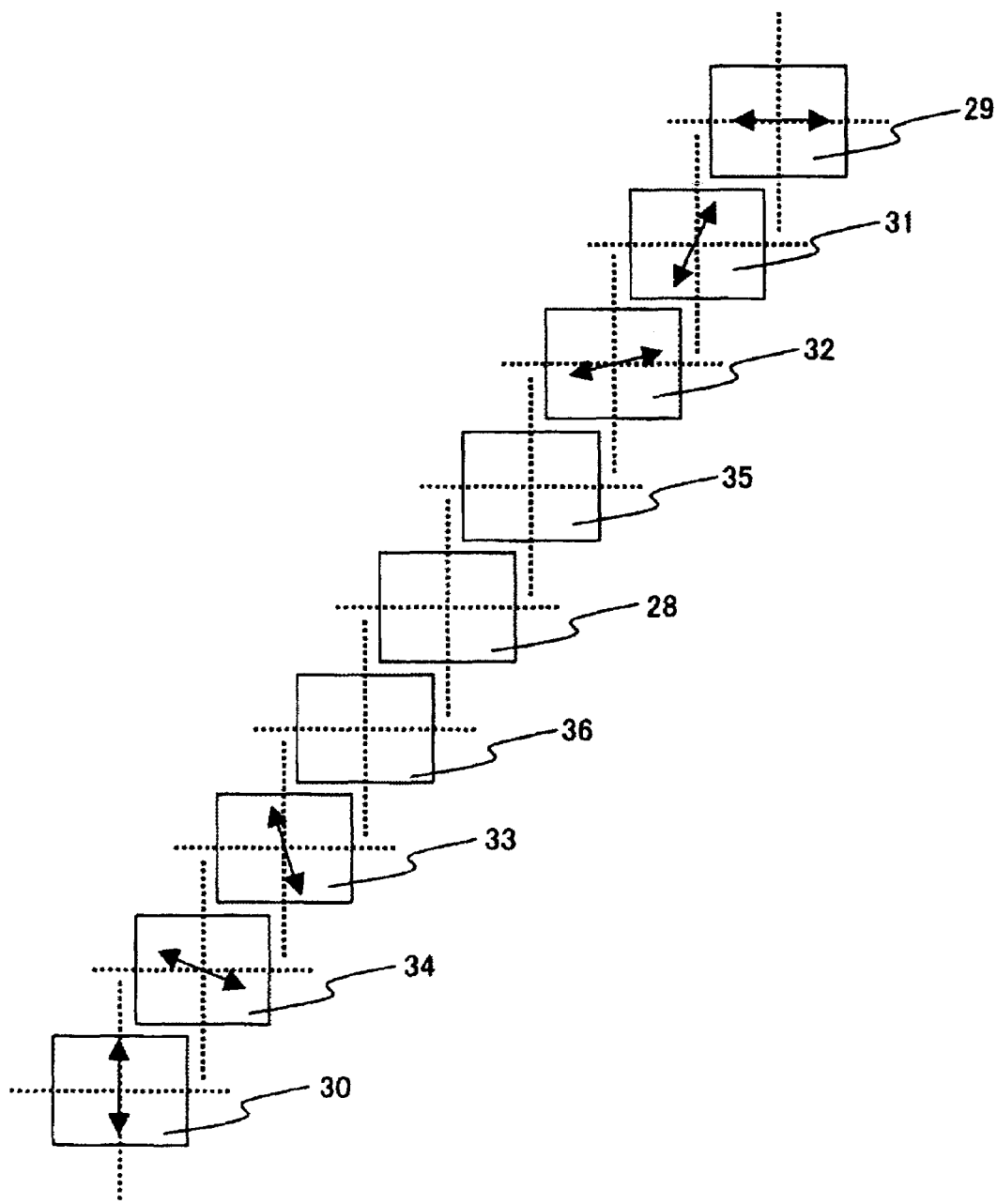
FIG. 7 is an illustrative diagram showing a relation between optical axes of a retardation film and a polarization plate of the liquid crystal display according to the first embodiment.

FIG. 7 is a schematic diagram showing a relation between optical axes of the retardation film and polarization plate of the liquid crystal display of the present invention shown in FIG. 1. In order to realize a large bandwidth circular polarization plate, it is necessary to dispose retardation films as shown in FIG. 7. It is desired that the delay axes of the first retardation film 31 and fourth retardation film 34 and the delay axes of the second retardation film 32 and second retardation film 33 are generally perpendicular. In addition, for the relation between the absorption axes of the first and second polarization plates and the delay axes of the first to fourth retardation films, it is desired that the delay axis of the first retardation film 31 is −105°, the delay axis of the second retardation film 32 is 15°, a delay axis of the third retardation film 33 is −75°, the delay axis of the fourth retardation film 34 is −15°, the absorption axis of the second polarization plate 30 is −90°, assuming that the absorption axis of the first polarization plate is 0°.

The second protective film 40 and third protective film 41 of the polarization plates of the present invention shown in FIGS. 5 and 6 are desired to have $R_{th}$ of 0 in order to reduce light leak to be observed along the oblique direction. However, the actual value is −5 nm or larger and 5 nm or smaller because of manufacture errors, variations and the like. This range ensures sufficient advantages. The material of the second protective film 40 and third protective film 41 is desired to be material having a smaller $R_{th}$ than that of a conventionally used TAC film, such as norbornene resin.

In order to further reduce light leak along the oblique direction during black display, it is desired to use the first retardation film 31 and fourth retardation film 34 having the $N_z$ coefficient of 0 or larger and smaller than 1. An optimum $N_z$ coefficient of the first retardation film 31 and fourth retardation film 34 is determined from a retardation (hereinafter called $R_e$) of the liquid crystal layer 21 in the in-plane and $R_{th}$ of the first negative C-Plate 35 and second negative C-Plate 36.

Figure 8A:
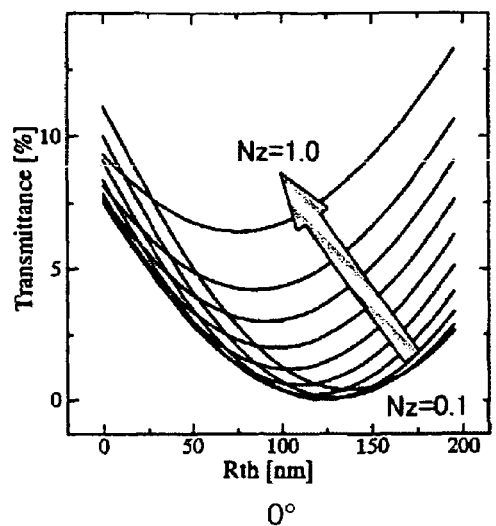
FIGS. 8A, 8B and 8C are graphs showing dependency of a transmittance during black display, upon $R_{th}$ of the negative C-Plate according to the first embodiment.
Figure 8B:
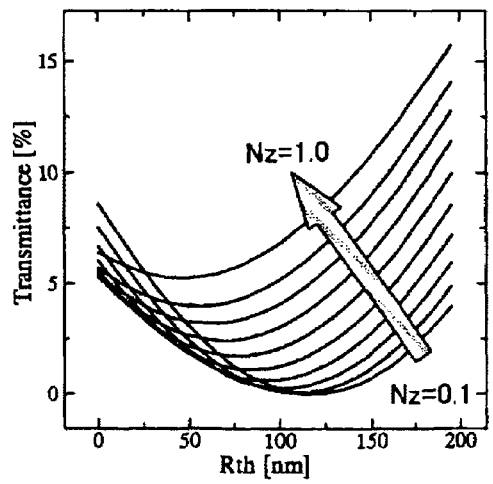
Figure 8C:
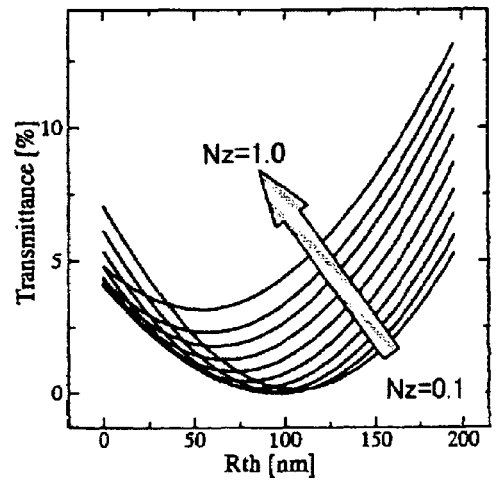

FIGS. 8A, 8B and 8C are diagrams showing dependency of a transmittance during black display, upon $R_{th}$ of the negative C-Plate. Theoretical calculations were conducted under the following conditions in order to confirm the advantages of the present invention which can reduce light leak along the oblique direction. A birefringence Δn of the liquid crystal layer 21 was set to 0.099 and a wavelength of incidence light was set to 550 nm. A thickness of the liquid crystal layer 21 was set to 3 μm to 5 μm. $R_{th}$ of the first negative C-Plate and second negative C-Plate was the same.

A thickness of the liquid crystal layer 21 was 3.5 μm from calculation results shown in FIGS. 8A, 8B and 8C. A light incidence angle was set to 60°, and three azimuth directions were used: 0° (FIG. 8A), 30° (FIG. 8B) and 45° (FIG. 8C) from the absorption axis of the first polarization plate 29. The $N_z$ coefficients of the first retardation film 31 and fourth retardation film 34 were changed from 0.1 to 1.0 at an interval of 0.1. It can be understood from the calculation results that the transmittance during black display depends upon $R_{th}$ of the negative C-Plate.

Figure 9:
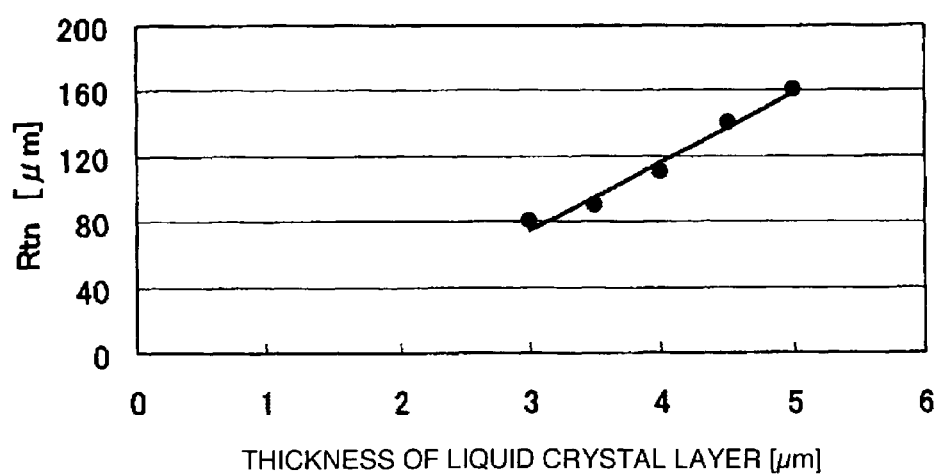
FIG. 9 is a graph showing dependency of $R_{th}$ of the negative C-Plate having the lowest transmittance during black display, upon a thickness of a liquid crystal layer 21.

FIG. 9 is a graph showing dependency of $R_{th}$ of the negative C-Plate having the lowest transmittance during black display, upon a thickness of the liquid crystal layer 21. It can be understood from these results that an optimum $R_{th}$ of the negative C-Plate is approximately proportional to a thickness of the liquid crystal layer 21.

The viewing angle characteristics of a contrast ratio have been studied by using an optimum $R_{th}$ of the negative C-Plate. The viewing angle characteristics were evaluated by Class I and Class II of ISO13406-2 (Ergonomic requirement for flat panel display). $\theta_{range}$ of Class II is ±22° as viewed from the substrate front under the conditions that a width across corners of the liquid crystal display is 2.2 inches and a distance between the liquid crystal display and the viewer's eyes is 300 mm. Class I assumes that many people view a display, and $\theta_{range}$ is defined as ±40°. An average contrast ratio was obtained in each $\theta_{range}$. The average contrast ratio is an average obtained through surface integral along an omnidirection of contrast ratios in the polar angle range from a direction (0°) perpendicular to the substrate surface to $\theta_{range}$.

Figure 10A:
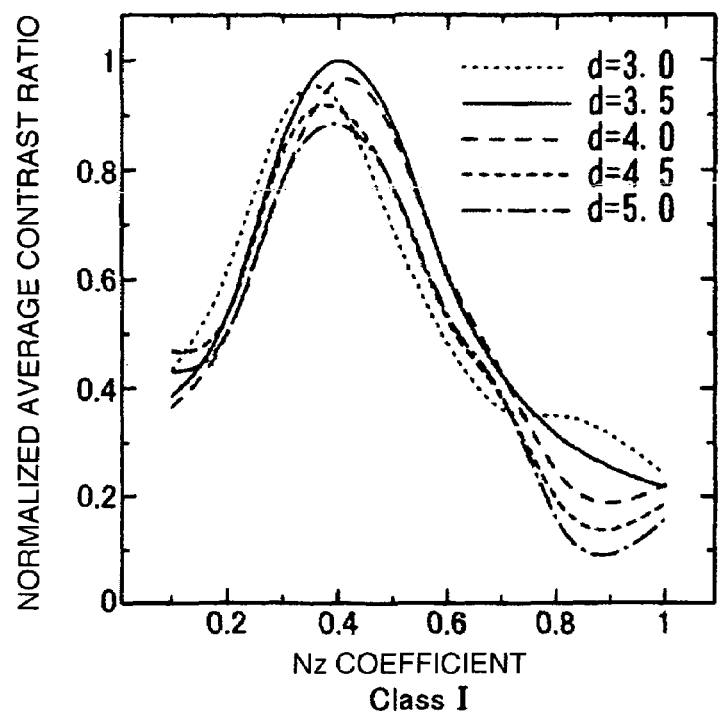
FIGS. 10A and 10B are graphs showing dependency of a normalized average contrast ratio, upon an $N_z$ coefficient, in Class I and in Class II, respectively.
Figure 10B:
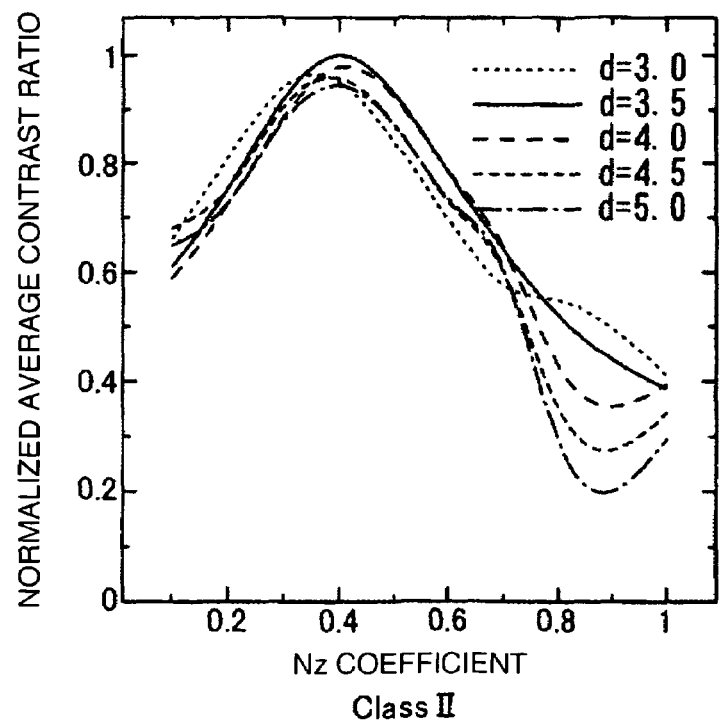

FIGS. 10A and 10B are graphs showing dependency of a normalized average contrast ratio upon an $N_z$ coefficient, in Class I (FIG. 10A) and in Class II (FIG. 10B), respectively. The normalized average contrast ratio is a value normalized by setting a maximum average contrast ratio (under these conditions, a thickness of the liquid crystal layer 21 is 3.5 μm and a $N_z$ coefficient is 0.4) to 1.

As shown in FIGS. 10A and 10B, an inflection point appears near at $N_z$ points of 0.2 and 0.7. Therefore, under the conditions that a thickness of the liquid crystal layer 21 is set to 3 μm to 5 μm (in this case, a birefringence of liquid crystal is 0.099) and $R_{th}$ of the negative C-Plate is set to 80 nm or larger and 160 nm or smaller, it is desired that the $N_z$ coefficient is in a range of 0.2 or larger and 0.7 or smaller in order to reduce light leak to be observed along the oblique direction, and it is desired that a thickness of the liquid crystal layer is 3.5 μm, $R_{th}$ of the negative C-Plate is 90 nm, and the $N_z$ coefficient of the half wavelength plate is 0.4.

Figure 11:
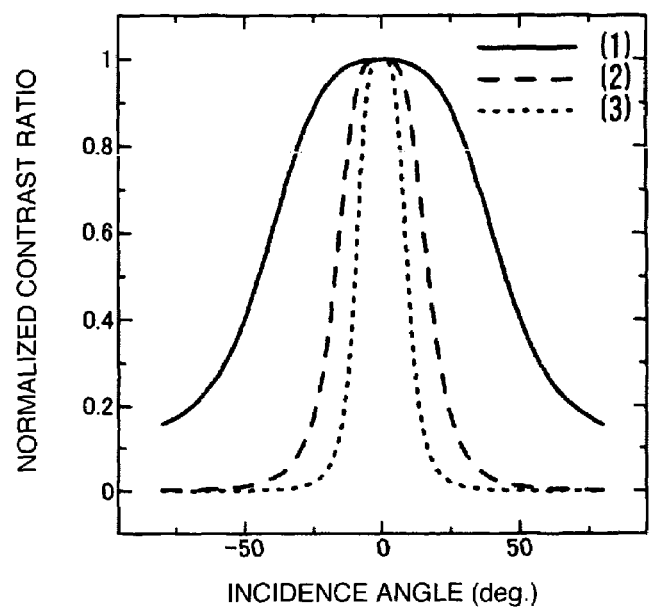
FIG. 11 is a graph showing dependency of a contrast ratio along a 45° direction, upon an absorption axis of a first polarization plate according to the first embodiment.

FIG. 11 is a diagram showing incidence angle dependency of a contrast ratio along a 45° direction relative to an absorption axis of the first polarization plate, under the following three conditions:

(1) The $N_z$ coefficients of the first retardation film 31 and fourth retardation film 34 are 0.4. $R_{th}$ of the second protective film 40 and third protective film 41 is 0 nm.

(2) The $N_z$ coefficients of the first retardation film 31 and fourth retardation film 34 are 0.4. $R_{th}$ of the second protective film 40 and third protective film 41 is 37 nm.

(3) The $N_z$ coefficients of the first retardation film 31 and fourth retardation film 34 are 1. $R_{th}$ of the second protective film 40 and third protective film 41 is 37 nm.

As seen from FIG. 11, high contrast ratios along the oblique direction can be obtained in the order of (1)>(2)>(3).

According to the above-described results, the present invention provides a liquid crystal display in the VA mode using a circular polarization plate capable of reducing light leak along the oblique direction and obtaining a high contrast ratio in a wide viewing angle range.

Second Embodiment

Next, the second embodiment will be described with reference to the accompanying drawings. A transflective liquid crystal display can be realized by applying a circular polarization plate to a liquid crystal display in the VA mode. The layout of polarization plates and retardation films of a transflective liquid crystal display in the VA mode of the second embodiment is similar to that of the first embodiment, and the advantages similar to those of the first embodiment can be obtained.

Figure 12:
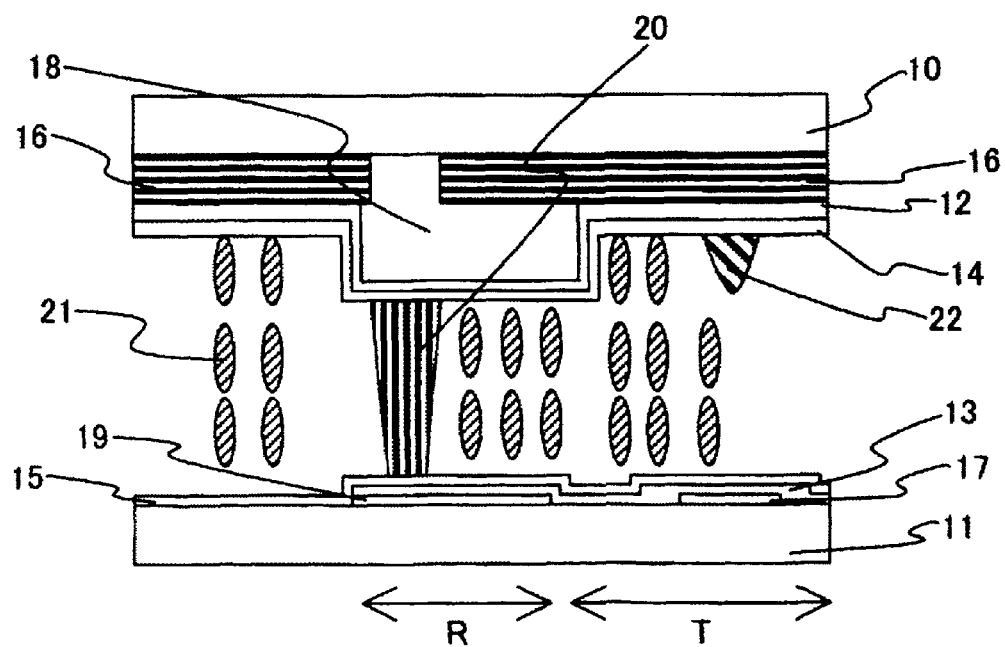
FIG. 12 is a schematic diagram showing the cross sectional structure of a liquid crystal cell of a liquid crystal display according to a second embodiment of the present invention.
Figure 13:
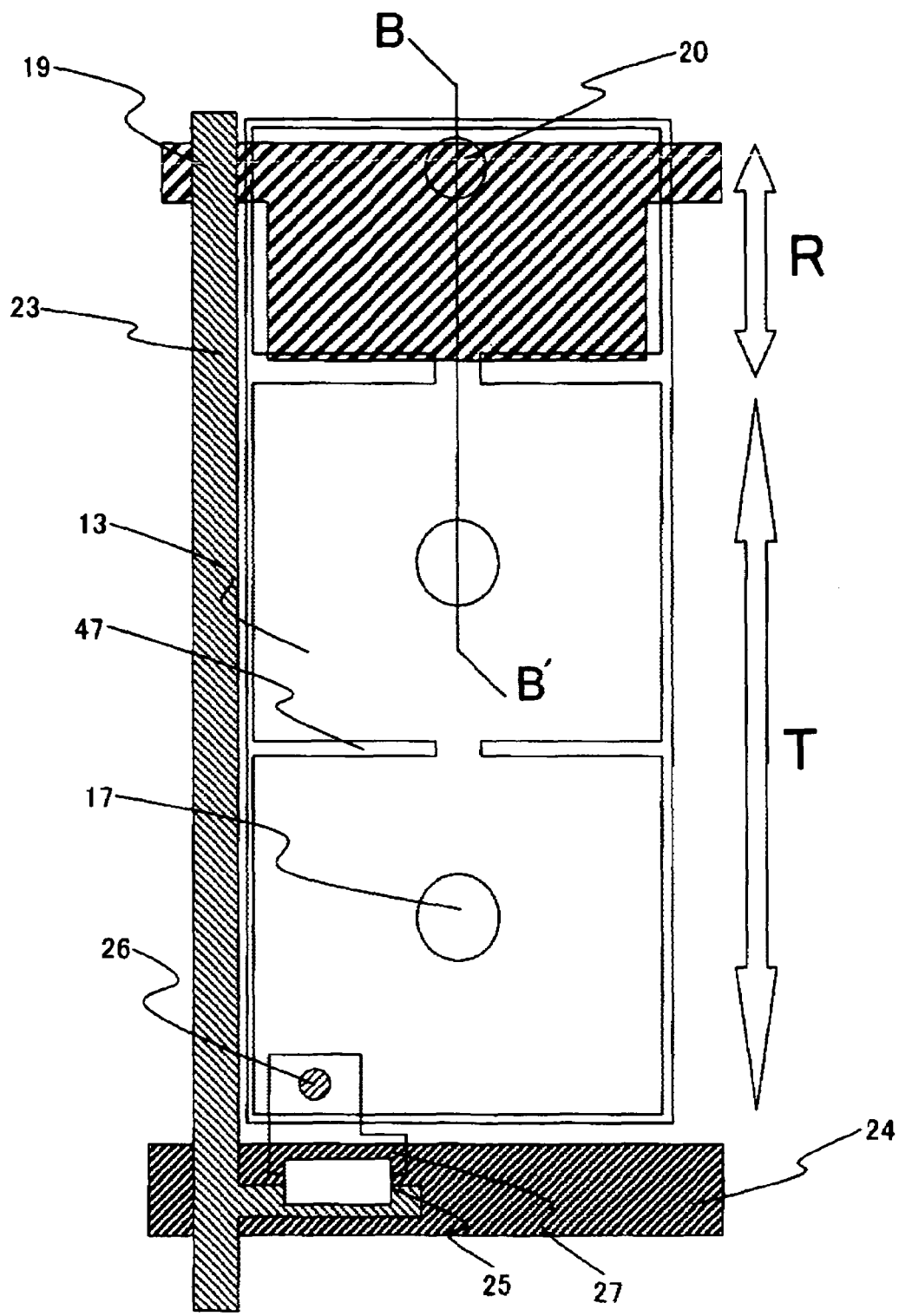
FIG. 13 is a plan view showing the outline structure of one pixel of a second substrate according to the second embodiment.

FIG. 12 is a schematic diagram showing the cross sectional structure of a liquid crystal cell 28 of the transflective liquid crystal display in the VA mode, taken along line B-B' shown in FIG. 13. The transflective liquid crystal display of the second embodiment has a transmission area (T area in FIG. 12) and a reflection area (R area in FIG. 12) in one pixel. The liquid crystal cell 28 has a first substrate 10, a liquid crystal layer 21 and a second substrate 11, and the first substrate 10 and second substrate 11 sandwiches the liquid crystal layer 21. The first substrate 10 has a color filter 16, a common electrode 12 and a first alignment film 14 on the liquid crystal layer 21 side. The second substrate 11 has pixel electrodes 13 and a second alignment film 15 on the liquid crystal layer 21 side. A reflection plate 19 is disposed in the reflection area of the second substrate 11 on the liquid crystal layer 21 side. A stepped region 18 is disposed in the reflection area of the first substrate 10 on the liquid crystal layer 21 side. The stepped region 18 has a columnar spacer 20 for maintaining constant the thickness of the liquid crystal layer 21. An alignment control projection 22 is provided on the common electrode 12 side nearer to the liquid crystal layer 21. A black matrix 17 is disposed on the second substrate 11 nearer to the liquid crystal layer.

FIG. 13 is a plan view showing the outline structure of one pixel of the second substrate 11. A transflective liquid crystal display requires a reflection plate to reflect incidence light. The reflection plate 19 for reflecting incidence light is therefore disposed in the reflection area such as shown in FIG. 13.

The reflection plate 19 is provided for reflection display in order to reflect external light incident upon the first substrate. It is desired that the reflection plate 19 has an irregular surface in order to diffuse reflected light. The reflection plate 19 is connected to the pixel electrode 13 in order to make the transmission area and reflection area have the same potential. Since the reflection plate 19 has a role of a pixel electrode in the reflection area, it is desired that the reflection plate is made of high conductivity metal. It is particularly desired that the reflection plate 19 is made of silver, aluminum or the like which has a high reflectivity in a visual range and excellent conductivity.

The stepped region 18 is made of resist material. In a transflective liquid crystal display, it is desired that $R_e$ in the reflection area of the liquid crystal layer 21 is set to a half of $R_e$ in the transmission area, in order to make coincident the transmittance characteristics relative to voltage in the transmission area and the transmittance characteristics relative to voltage in the reflection area. It is therefore desired that a step is provided to the reflection area to set a thickness of the liquid crystal layer 21 in the reflection area to a half of a thickness of the liquid crystal layer in the transmission area.

With the above-described structure, the transmission area of the transflective liquid crystal display of the second embodiment is substantially and optically equivalent to the transmission area of the liquid crystal display of the first embodiment. Therefore, the transmission characteristics of the transflective liquid crystal display of this embodiment provide the advantages similar to those of the first embodiment, by using a generally optically isotropic film as the protective film of the polarization plate and by using retardation films having the $N_z$ coefficient of 0 or larger and smaller than 1 as the first retardation film 31 and fourth retardation film 34. It is therefore possible for a liquid crystal display in the VA mode using a circular polarization plate to reduce light leak along the oblique direction and obtain a high contrast ratio in a wide viewing angle range.

Third Embodiment

Next, the third embodiment will be described with reference to the accompanying drawings. In the third embodiment, a positive C-Plate for compensating for a phase difference of a TAC film is disposed between a negative C-Plate and the TAC film to thereby obtain advantages similar to those when the phase difference of the protective layer is set to 0.

Figure 14:
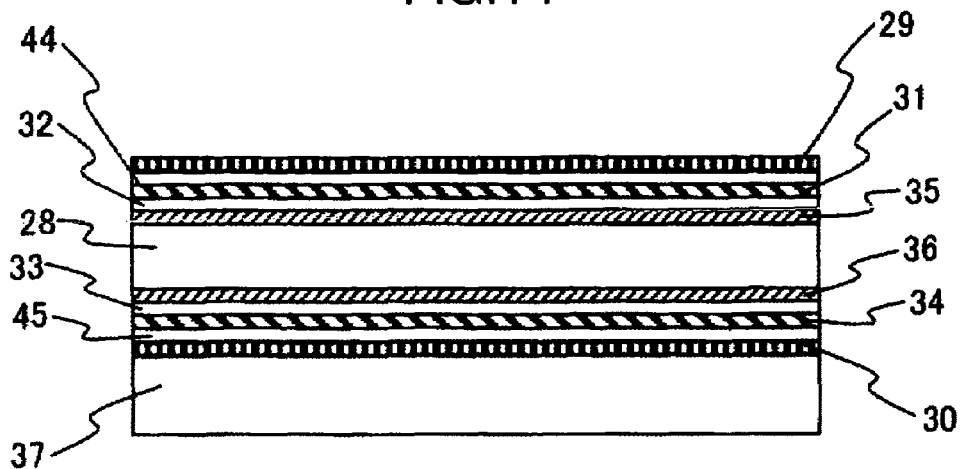
FIG. 14 is a schematic diagram showing the cross sectional structure of a liquid crystal display according to a third embodiment of the present invention.

FIG. 14 is a schematic diagram showing the cross sectional structure of a liquid crystal display according to the third embodiment. The liquid crystal display of this embodiment is constituted of a liquid crystal cell 28 disposed between a first polarization plate 29 and a second polarization plate 30. Four retardation films are disposed between the first polarization plate 29 and liquid crystal cell 28. The four retardation films include a first positive C-Plate (hereinafter called a positive C-Plate) 44, a first retardation film 31, a second retardation film 32 and a first negative C-Plate 35 in this order from the first polarization plate 29 side. Similarly, four retardation films are disposed between the second polarization plate 30 and liquid crystal cell 28. The four retardation films include a second negative C-Plate 36, a third retardation film 33, a fourth retardation film 34 and a second positive C-Plate 45 in this order from the side nearer to the liquid crystal cell 28. A backlight unit 37 is disposed on the second retardation film 30 on the side opposite to the liquid crystal cell 28.

Namely, the liquid crystal display has the structure that the positive C-Plate (first positive C-Plate 44 and second positive C-Plate 45) is disposed between the first substrate 10 and first polarization plate 29 and between the second substrate 11 and second polarization plate 30.

The structure of the first retardation film 31 to fourth retardation film 34 is similar to that of the first or second embodiment.

The first positive C-Plate 44 can be regarded as an optically positive index ellipsoid which has a refractive index difference of almost 0 in the in-plane direction and whose refractive index in the thickness direction is larger than a refractive index in the in-plane direction. By setting the optical characteristics of the TAC film capable of being regarded as the negative C-Plate equal to the optical characteristics of the positive C-Plate, a phase difference of the TAC film can be compensated. However, even if $R_{th}$ of the first positive C-Plate 44 is set almost equal to $R_{th}$ of the second protective film 40, it is indicated that if the refractive index of the index ellipsoid in the main axis direction is different, the retardation films have different angle retardation characteristics (Liquid Crystal Forum (PC05), 2004: Toshiuki HYUUGA, Takahiro ISHINABE, Tatsuo UCHIDA).

It is therefore desired that approximately the same design parameter $T_z$ representative of the angle characteristics of a retardation film defined in the following is used for both the first positive C-Plate 44 and second protective film 40:

$$T_z = \frac{n_x\sqrt{n_z^2-1} - n_z\sqrt{n_y^2-1}}{n_z \cdot (n_x - n_y)} \quad (3)$$

The first positive C-Plate 44 can be manufactured by forming a film of homeotropic alignment polymer liquid crystal or molding uniaxially compressed polymer or acetate cellulose.

Similar to the first positive C-Plate 44, it is desired that $T_z$ of the second positive C-Plate 45 is set to approximately the same $T_z$ as that of the second protective film 40. The second positive C-Plate 45 can be manufactured by forming a film of homeotropic alignment polymer liquid crystal or molding uniaxially compressed polymer or acetate cellulose.

The structure of the liquid crystal cell 28 is similar to that of the first or second embodiment.

By using the positive C-Plate, this embodiment can obtain generally the same advantages as those of using an optically isotropic film as a substitution for the TAC film which is the protective film of the retardation film described in the first and second embodiments. It is therefore possible to mitigate light leak along the oblique direction of a liquid crystal display in the VA mode using a circular polarization plate and obtain a high contrast ratio in a wide viewing angle range.

Fourth Embodiment

Figure 15:
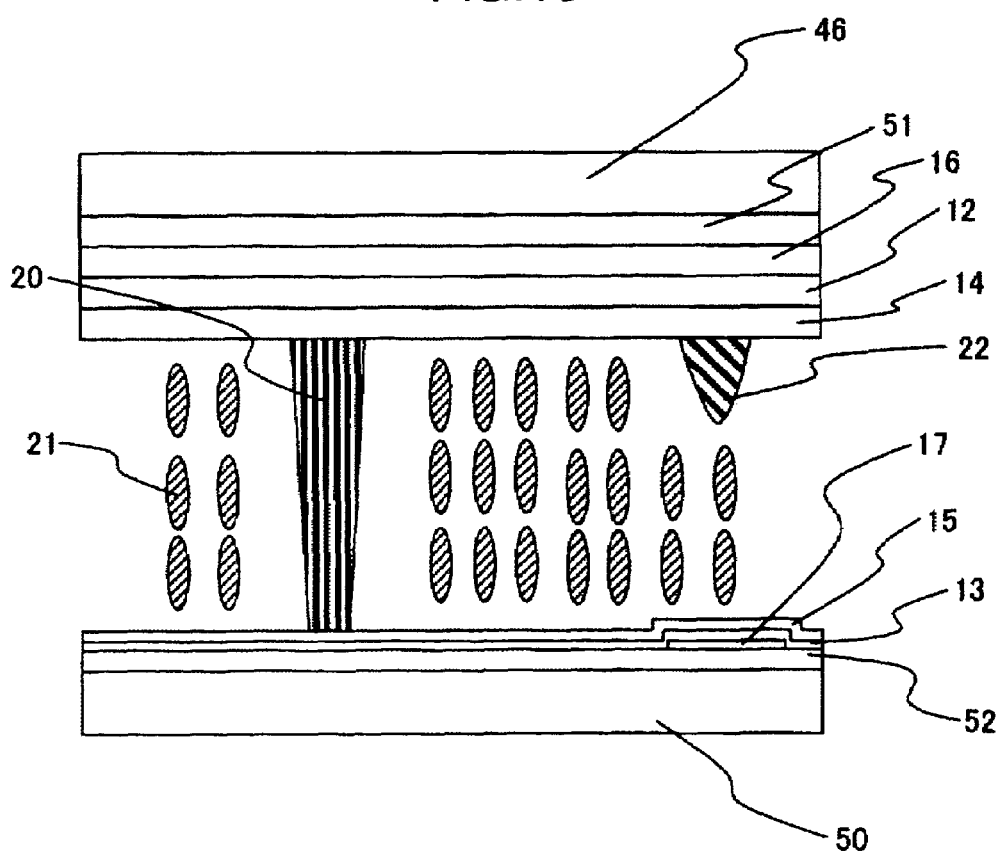
FIG. 15 is a schematic diagram showing the cross sectional structure of a liquid crystal display according to a fourth embodiment of the present invention.

Next, the fourth embodiment will be described with reference to the accompanying drawing. This embodiment changes the structure of the liquid crystal cell 28 of a liquid crystal display similar to that shown in FIG. 1. FIG. 15 is a schematic diagram showing the cross sectional structure of a liquid crystal display according to the fourth embodiment. The liquid crystal cell 28 of this embodiment has a first substrate 10 and second substrate 11 sandwiching a liquid crystal layer 21. The first substrate 10 and second substrate 11 may be a first film substrate 46 and a second film substrate 50 made of plastic or polyether sulfone (hereinafter called PES) other than glass. A first gas barrier 51 and a second gas barrier 52 are disposed on the first film substrate 46 and second film substrate 50, respectively.

The first film substrate 46 and second film substrate 50 may be replaced with retardation films: a first negative C-Plate 35 and a second negative C-Plate 36, respectively. Namely, one of or both the first film substrate 46 and second film substrate 50 may have the function of an optically positive index ellipsoid which has a refractive index difference of almost 0 in the in-plane direction and whose refractive index in the thickness direction is larger than a refractive index in the in-plane direction.

One of or both the first film substrate 46 and second film substrate 50 may have the structure having a quarter wavelength phase difference or a half wavelength phase difference.

The first gas barrier 51 is provided to prevent air from transmitting through the first film substrate 46. The first gas barrier 51 can be formed by forming a nitride film or the like on the substrate surface.

Similar to the first gas barrier, the second gas barrier 52 is provided to prevent air from transmitting through the second film substrate 50. Similar to the first gas barrier 51, the second gas barrier 52 can be formed by forming a nitride film or the like on the substrate surface. It is necessary to use the gas barrier if the retardation film is used as a substitute substrate. In this case, a silicon nitride film or the like is formed on the retardation film.

The structure of the liquid crystal cell 28 is similar to that described in the first to third embodiments.

The layout of the retardation films is similar to that described in the first embodiment. If the substitute substrate has a phase difference, it is necessary to re-consider the layout of retardation films. For example, if the phase difference of the substitute substrate is generally equal to that of the negative C-Plate, the first negative C-Plate 35 and second negative C-Plate 36 may be removed or their $R_{th}$ may be lowered.

A color filter 16 can be formed on the film substrate by utilizing Roll-to-Roll techniques such as techniques described in IDW' 04 Proceedings, FMC3-3, p. 579, T. Eguchi, et. al.

In this embodiment, by using a plastic substrate or a film substrate as one of or both the first substrate 10 and second substrate 11, it is possible to make a liquid crystal display light and thin and obtain a high contrast ratio in a wide viewing angle range.

Fifth Embodiment

Next, the fifth embodiment will be described with reference to the accompanying drawings. This embodiment has the advantages that a contrast ratio can be improved in a wide viewing angle range by removing the TAC film as the protective layer of the retardation film of a liquid crystal display in the VA mode using a circular polarization plate.

Figure 16:
FIG. 16 is a schematic diagram showing the cross sectional structure of a first polarization plate of a liquid crystal display according to a fifth embodiment of the present invention.
Figure 17:
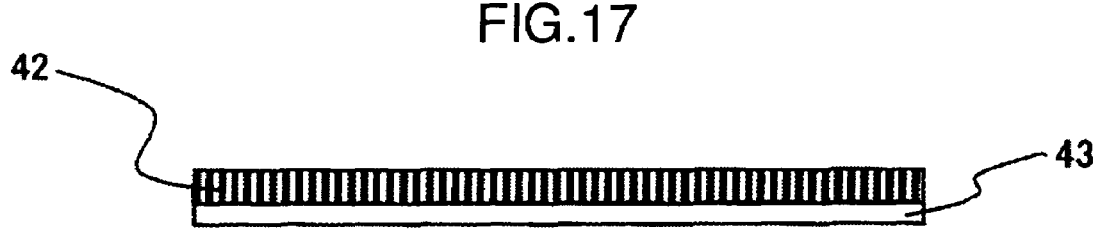
FIG. 17 is a schematic diagram showing the cross sectional structure of a second polarization plate of the liquid crystal display according to the fifth embodiment.

FIGS. 16 and 17 are schematic diagrams showing cross sectional structures of a first polarization plate 29 and a second polarization plate 30 used by the liquid crystal display of this embodiment.

A conventional polarization plate has TAC films as protective layers. However, as described above, a phase difference of the TAC film of a liquid crystal display in the VA mode having a circular polarization plate results in a lowered contrast ratio. In the liquid crystal display of this embodiment, the retardation film is provided with the function of the protective film is provided, and the protective layer disposed on the polarization plate in the liquid crystal layer side is omitted. Namely, a first protective film 38 is disposed on a first polarization layer 39 on the side opposite to a liquid crystal layer 21, whereas a second protective film 43 is disposed on a second polarization layer 42 on the side opposite to the liquid crystal layer 21, to thereby obtain advantages similar to those of the first embodiment.

A first polarization plate 29 and a second polarization plate 30 do not have a second protective film 40 and a third protective film 41, and a first polarization layer 39 and a second polarization layer 42 are disposed directly on retardation films. A polarization layer which does not require a protective film may be used, and this layer can be achieved by using enzyme synthesis amylose or the like.

The structure of a liquid crystal cell 28 is similar to that described in the first to third embodiments.

The layout of retardation films is similar to that described in the first embodiment.

The embodiment can obtain a high contrast ratio in a wide viewing angel range while realizing a thin, low cost liquid crystal display.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display comprising:
   a first substrate and a second substrate;
   liquid crystal layer sandwiched between said first substrate and said second substrate;
   a first polarization plate disposed on said first substrate on a side opposite to said liquid crystal layer;
   a second polarization plate disposed on said second substrate on side opposite to said liquid crystal layer;
   one or more retardation films disposed between said first substrate and said first polarization plate and between said second substrate and said second polarization plate;
   pixel electrodes disposed on one of said first substrate and said second substrate on a side of said liquid crystal layer; and
   a counter electrode disposed on the other of said first substrate and said second substrate on the side of said liquid crystal layer,
   wherein:
   longer axes of liquid crystal molecules of said liquid crystal layer are aligned generally perpendicular to said first substrate and said second substrate while voltage is not applied;
   said first polarization plate and said second polarization plate include each a polarization layer and a pair of protective layers sandwiching said polarization layer;

a retardation $R_{th}$ of said protective layers disposed on said first polarization plate on the side of said liquid crystal layer and on said second polarization plate on the side of said liquid crystal layer is −5 nm or larger and 5 nm or smaller; and a negative C-Plate is provided between said first substrate and said retardation film and between said second substrate and said retardation film.

2. The liquid crystal display according to claim 1, wherein signal lines and scan lines disposed on said first substrate or said second substrate, and a thin film transistor is disposed at each cross point between said signal line and said scan line.

3. The liquid crystal display according to claim 1, wherein a color filter is disposed on said first substrate or said second substrate on a side of said liquid crystal layer.

4. The liquid crystal display according to claim 1, wherein one of or both said first substrate and said second substrate are made of polymer material.

5. The liquid crystal display according to claim 1, wherein one of or both said first substrate and said second substrate have a quarter wavelength phase difference or a half wavelength phase difference.

6. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
said first polarization plate and said second polarization plate include each a polarization layer and a pair of protective layers sandwiching said polarization layer;
a retardation $R_{th}$ of said protective layers disposed on said first polarization plate on the side of said liquid crystal layer and on said second polarization plate on the side of said liquid crystal layer is −5 nm or larger and 5 nm or smaller; and
said retardation film includes a first retardation film having a quarter wavelength phase difference on a side where said liquid crystal layer is disposed and a second retardation film having a half wavelength phase difference on a side where said first polarization plate and said second polarization plate are disposed; and
an $N_z$ coefficient of said second retardation film is 0 or larger and smaller than 1.

7. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
said first polarization plate and said second polarization plate include each a polarization layer and a pair of protective layers sandwiching said polarization layer;
a retardation $R_{th}$ of said protective layers disposed on said first polarization plate on the side of said liquid crystal layer and on said second polarization plate on the side of said liquid crystal layer is −5 nm or larger and 5 nm or smaller; and
one of or both said first substrate and said second substrate have a function of an optically positive index ellipsoid which has a refractive index of almost 0 in an in-plate direction and whose refractive index in a thickness direction is larger than a refractive index in the in-plane direction.

8. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
said first polarization plate and said second polarization plate include each a polarization layer and a protective layer disposed on said polarization layer only on the side opposite to said liquid crystal layer; and
a negative C-Plate is provided between said first substrate and said retardation film and between said second substrate and said retardation film.

9. The liquid crystal display according to claim 8, wherein signal lines and scan lines disposed on said first substrate or said second substrate, and a thin film transistor is disposed at each cross point between said signal line and said scan line.

10. The liquid crystal display according to claim 8, wherein a color filter is disposed on said first substrate or said second substrate on a side of said liquid crystal layer.

11. The liquid crystal display according to claim 8, wherein one of or both said first substrate and said second substrate are made of polymer material.

12. The liquid crystal display according to claim 8, wherein one of or both said first substrate and said second substrate have a quarter wavelength phase difference or a half wavelength phase difference.

13. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
said first polarization plate and said second polarization plate include each a polarization layer and a protective layer disposed on said polarization layer only on the side opposite to said liquid crystal layer;
said retardation film includes a first retardation film having a quarter wavelength phase difference on a side where said liquid crystal layer is disposed and a second retardation film having a half wavelength phase difference on a side where said first polarization plate or said second polarization plate are disposed; and
an $N_z$ coefficient of said second retardation film is 0 or larger and smaller than 1.

14. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
said first polarization plate and said second polarization plate include each a polarization layer and a protective layer disposed on said polarization layer only on the side opposite to said liquid crystal layer; and
one of or both said first substrate and said second substrate have a function of an optically positive index ellipsoid which has a refractive index of almost 0 in an in-plate direction and whose refractive index in a thickness direction is larger than a refractive index in the in-plane direction.

15. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
a positive C-Plate is disposed between said first substrate and said first polarization plate and between said second substrate and said second polarization plate; and
a negative C-Plate is provided between said first substrate and said retardation film and between said second substrate and said retardation film.

16. A liquid crystal display comprising:
a first substrate and a second substrate;
a liquid crystal layer sandwiched between said first substrate and said second substrate;
a first polarization plate disposed on said first substrate on a side opposite to said liquid crystal layer;
a second polarization plate disposed on said second substrate on a side opposite to said liquid crystal layer;
one or more retardation films disposed between said first substrate and said first polarization plate and between said second substrate and said second polarization plate;
pixel electrodes disposed on one of said first substrate and said second substrate on a side of said liquid crystal layer; and
a counter electrode disposed on the other of said first substrate and said second substrate on the side of said liquid crystal layer,
wherein:
longer axes of liquid crystal molecules of said liquid crystal layer are aligned generally perpendicular to said first substrate and said second substrate while voltage is not applied;
a positive C-Plate is disposed between said first substrate and said first polarization plate and between said second substrate and said second polarization plate; and
one of or both said first substrate and said second substrate have a function of an optically positive index ellipsoid which has a refractive index of almost 0 in an in-plate direction and whose refractive index in a thickness direction is larger than a refractive index in the in-plane direction.

* * * * *